US006367972B1

(12) United States Patent
Kamiyama et al.

(10) Patent No.: US 6,367,972 B1
(45) Date of Patent: Apr. 9, 2002

(54) NON-CONTACT TEMPERATURE SENSOR WITH TEMPERATURE COMPENSATING HEAT SENSITIVE ELEMENTS ON PLASTIC FILM

(75) Inventors: Jun Kamiyama; Shinichi Saito; Toshiyuki Nojiri; Kenichi Hiroe; Toshikazu Okada, all of Tokyo (JP)

(73) Assignee: Ishizuka Electronics Corporation, Tokyo (JP)

( * ) Notice: Subject to any disclaimer, the term of this patent is extended or adjusted under 35 U.S.C. 154(b) by 0 days.

(21) Appl. No.: 09/320,576

(22) Filed: May 27, 1999

(30) Foreign Application Priority Data

Sep. 29, 1998 (JP) ............................................. 10-275262

(51) Int. Cl.[7] ................................................. G01J 5/06
(52) U.S. Cl. ......................... 374/133; 374/132; 327/512
(58) Field of Search ................................ 374/133, 132, 374/121, 170; 327/512

(56) References Cited

U.S. PATENT DOCUMENTS

| | | | | |
|---|---|---|---|---|
| 4,722,612 A | * | 2/1988 | Junkert et al. | 374/133 |
| 4,877,331 A | * | 10/1989 | Schrors et al. | 374/121 |
| 5,056,929 A | * | 10/1991 | Watanabe et al. | 136/213 |
| 5,626,139 A | * | 5/1997 | Szeles et al. | 374/133 |
| 5,653,239 A | * | 8/1997 | Pompei et al. | 374/121 |
| 6,048,092 A | * | 4/2000 | Kimura et al. | 374/133 |
| 6,048,093 A | * | 4/2000 | Pompei | 374/133 |
| 6,129,673 A | * | 10/2000 | Fraden | 600/474 |
| 6,149,298 A | * | 11/2000 | Kraus et al. | 374/133 |
| 6,219,573 B1 | * | 4/2001 | Pompei | 600/474 |

FOREIGN PATENT DOCUMENTS

| | | | |
|---|---|---|---|
| JP | 58-118681 | * | 7/1983 |
| JP | 4-122341 | | 11/1992 |

* cited by examiner

Primary Examiner—Diego Gutierrez
Assistant Examiner—Stanley J. Pruchnic
(74) Attorney, Agent, or Firm—McDermott, Will & Emery

(57) ABSTRACT

A non-contact temperature sensor includes a holder serving as a light conducting portion for guiding infrared rays incident from a first opening at its one end; a plastic film arranged at a second opening of the other end of tile light conducting portion; a cover for sealing the second opening at the other end of the holder so as to provide a space between itself and the plastic film, an infrared ray detection heat-sensitive element arranged on the side of the space of the plastic film, for detecting the infrared rays incident from the first opening; and a temperature compensating heat-sensitive means arranged in the vicinity of the holder, for detecting the temperature of the holder. In this configuration, the surface temperature of the body-to-be-detected can be precisely detected in a short time.

23 Claims, 12 Drawing Sheets

F I G. 6
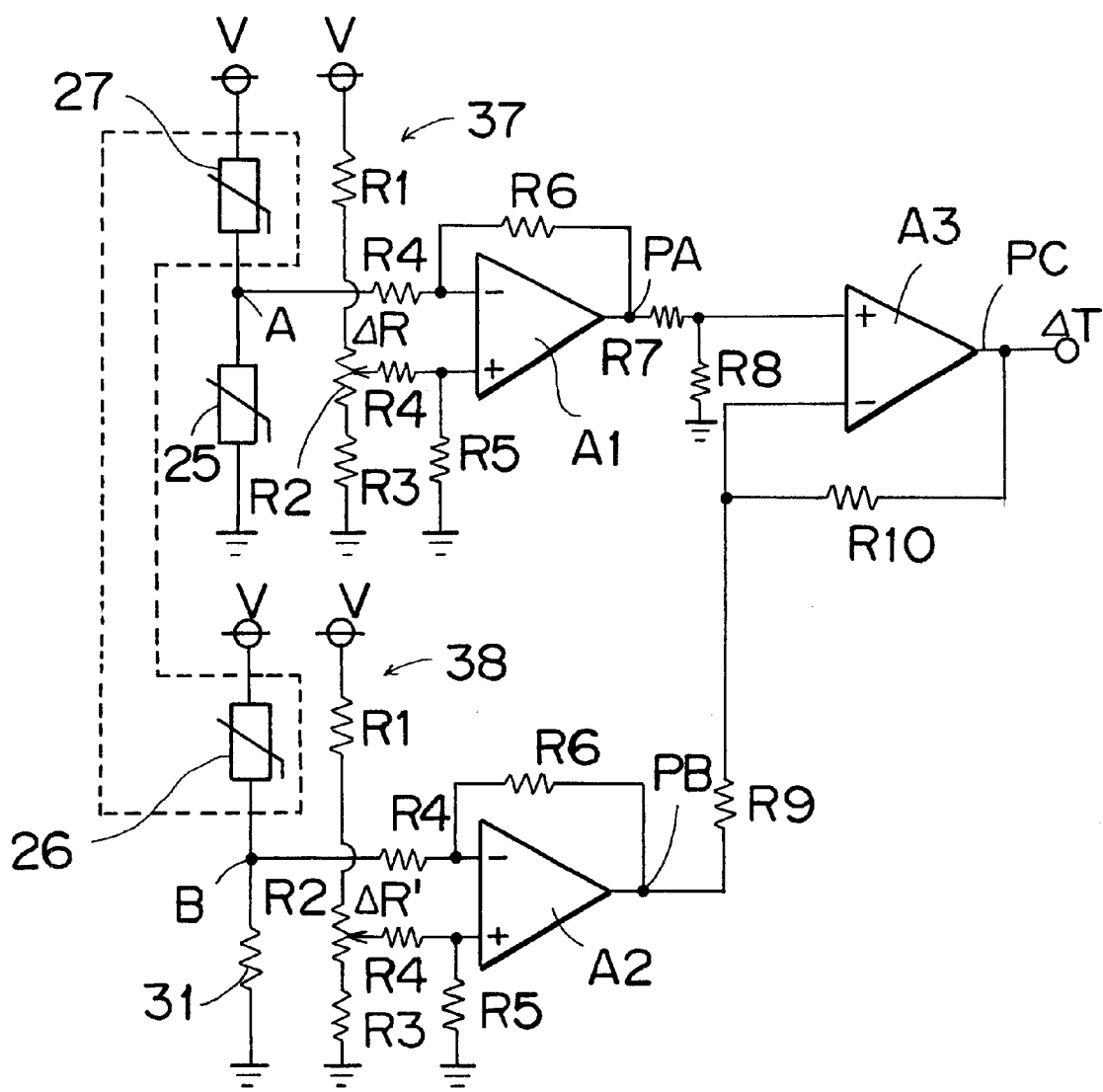

NON-CONTACT TEMPERATURE SENSOR WITH TEMPERATURE COMPENSATING HEAT SENSITIVE ELEMENTS ON PLASTIC FILM

BACKGROUND OF THE INVENTION

1. Field of the Invention

The present invention relates to a non-contact temperature sensor and a detecting circuit therefor, and more particularly to a non-contact temperature sensor for sensing or detecting the surface temperature of a rolling body such as a heating/fixing roller of a fixing device in order to fix a non-fixed toner image on a sheet of paper in a fixing device such as a copying machine.

2. Description of the Related Art

Conventionally, a contact temperature sensor has been mainly used as a temperature sensor for a heating/fixing roller of a copier. The contact temperature sensor detects the temperature of the roller in a manner of keeping a heat-sensitive element in contact with the surface of the roller. The contact temperature sensor has an advantage that it can precisely detect the surface temperature of the heating/fixing roller, but also has a disadvantage that since a portion of the heat-sensitive element is kept in pressure-contact with on the surface of the heating/fixing roller under certain pressure, the surface of the roller may be damaged by a contact member or a heat-sensitive element.

Further, the contact member of the contact temperature sensor must be made of a material having a high abrasion resistance which can withstand the use for a long time and having a certain thickness to resist the pressure of a spring material for attaching the heat-sensitive element. Therefore, the contact temperature sensor has a disadvantage of giving great heat capacity to the heat-sensitive element, and not capable of providing a desired thermal response characteristic.

In order to overcome these disadvantages, several proposals of a non-contact sensor have been made.

The first proposal is a temperature sensor proposed in J-UM-4-122341 (Laid-Open) by the inventors of the present invention. This temperature sensor includes a heat-resistive insulating base plate having two leads of a conductive foil formed thereon, a heat-sensitive element located in a small hole between these two leads and connected therebetween, a supporting body which has at least a large opening for the heat-sensitive element and for the vicinity of the leads of the heat-resisting plate and attaches the heat-resisting plate on the lower face of the opening, and a thin film shielding plate having smaller thermal capacity than that of a supporting member attached on the upper face of the opening. This non-contact temperature sensor, which can sense the temperature of a body to be detected in a non-contact manner and reduce the thermal capacity of the sensor, can provide an excellent thermal response characteristic.

The second proposal is a non-contact temperature sensor as shown in FIG. 13. This non-contact temperature sensor includes a cylindrical non-contact temperature sensor body 10, an optical system 3 of a Fresnel lens provided at the tip of the sensor body 10, an infrared ray detecting element 1 of a thermo-pile, a temperature sensor 2 for measuring the temperature of the infrared ray detecting element 1 and another temperature sensor 4 for measuring the temperature of the optical system 3. The detecting element 1 and temperature sensors 2 and 4 are housed in the sensor body 1. The temperature sensors 2 and 4 may be posisters.

FIG. 14 shows a signal processing circuit of the non-contact temperature sensor shown in FIG. 13. In operation, an output from the infrared detecting element 1 is amplified by an amplifying unit 6 via a polarity-exchanging unit 5. The amplified output from the amplifying unit 6 is A/D converted into a digital signal by an A/D converting unit 9. The digital signal is further processed by a microcomputer 11. The temperature sensors 2 and 4 are supplied with a constant current from a constant current source 8. The signal from each of the temperature sensors 2 and 4, is switched by a switching unit 7, and converted into a digital signal by the A/D converting unit 7, which is in turn processed by the microcomputer 11. The non-contact temperature sensor is provided with a temperature compensating means for compensating for an error due to the optical system on the basis of a temperature difference between the temperatures sensed by the temperature sensors 2 and 4.

The non-contact temperature sensor according to the first proposal, where it is used for the heating/fixing roller of a copying machine, has a disadvantage that it can sense the temperature with sufficient sensitivity only when a distance between the heat-sensitive surface of the heat-sensitive element on the heat resisting plate and the roller face is set at about 0.5 mm. However, it is very difficult to set such a small distance. In addition, where the non-contact temperature sensor is mounted in proximity to the heating/fixing roller, it may be broken owing to paper jam of the copier which may occur.

The non-contact temperature sensor according to the second proposal shown in FIG. 13, in which the optical system is provided on the infrared ray incident face, has a disadvantage that toners are likely to be deposited on the optical system 3 when it is mounted on the heating/fixing roller, polluting the surface thereof, and that the transmitting amount of the infrared rays may be changed owing to the toners deposited on the surface of the optical system. As the pollution of the surface of the optical system is a result of the deposition of the toners or dust, the detecting sensitivity is lowered so that the temperature cannot be detected precisely. Therefore, where precise control of the temperature is required, this temperature sensor cannot be used.

The infrared rays radiated from the body to be detected is influenced by the ambient temperature. Therefore, the non-contact temperature sensor is provided with another separate temperature sensor for measuring the ambient temperature to measure a change in the ambient temperature. In this case, using a microcomputer 11 in the signal processing circuit as shown in FIG. 14, a complicated numerical computation of changing a function table must be carried out in accordance with changes in the transmission of the infrared rays and in the ambient temperature.

A thermistor, bolometer, a thermopile, pyroelectric type sensor may be used as an infrared ray detecting element. However, the thermistor and thermopile are low in sensitivity and high in cost. The pyroelectric type sensor, which requires a chopper, is problematic in reliability. Because of a technical problem of temperature compensation, the pyroelectric type sensor is also difficult to be used at a high temperature where a fixing device is used.

SUMMARY OF THE INVENTION

An object of the present invention is to provide a non-contact temperature sensor and detecting circuit used therefor which can detect the surface temperature of a body to-be-detected precisely for a short time.

In order to attain the above object, in accordance with the present invention, there is provided a non-contact temperature sensor comprising a holder serving as a light conducting portion for guiding infrared rays incident from a first opening at its one end; a plastic film arranged at a second opening of the other end of said light conducting portion; a cover for sealing the second opening at said other end of the holder so as to provide a space between itself and said plastic film, an infrared ray detecting heat-sensitive element arranged on the side of said space of said plastic film, for detecting the infrared rays incident from said first opening; and a temperature compensating heat-sensitive means arranged in the vicinity of the holder, for detecting the temperature of said holder.

In the non-contact temperature sensor according to the present invention, the infrared rays radiated from the surface of a body-to-be-detected, e.g. a heating/fixing roller are incident on the first opening of the holder and guided to the plastic film through the light conducting portion. Then, the plastic film absorbs the infrared rays at a wavelength corresponding to its inherent absorbing spectrum so that its temperature rises. The infrared ray detecting element detects a temperature rise to detect the surface temperature of the body. The temperature compensating means detects a temperature change in the holder and also the temperature change due to thermal radiation or convection around the sensor, thereby compensating for the surface temperature of the body detected by the infrared ray detecting element.

In the above configuration of the non-contact temperature sensor according to the present invention, if the first opening from which the infrared rays are incident is formed in a horizontally lengthy shape, when the opening is aligned with the direction of a heat generating body which is lengthy in an axial direction, such as a heating/fixing roller, the sensor can effectively trap the heat radiated from the body-to-be-detected, thereby enhancing the detecting sensitivity. In addition, since the space serves as a thermal insulating layer, if the infrared rays and the ambient temperature are detected, the temperature of the body can be detected precisely.

Preferably, the internal wall of the light conducting portion of the non-contact temperature sensor constitutes a reflecting face capable of reflecting the infrared rays. Therefore, the radiated heat can be effectively trapped by the infrared ray detecting element to improve the detecting sensitivity.

Since the two temperature compensating elements preferably arranged in proximity to each other are thermally coupled, the output from the infrared ray detecting element can be made free from that influence by the ambient temperature. Therefore, the structure of the detection circuit for the non-contact sensor can be simplified.

The plastic film of the heat-sensitive portion is preferably made of an infrared ray absorbing material. This improves the detecting sensitivity of the non-contact temperature sensor.

A detection circuit for a non-contact temperature sensor includes a first series circuit composed of said infrared ray detecting element and said first temperature compensating element, a second series circuit composed of said second temperature compensating element and a resistor element; and an arithmetic unit for processing an output from said first series circuit and another output from said second circuit to detect a surface temperature of a body-to-be-detected.

In this configuration, the ambient temperature can be canceled so that the surface temperature of the body-to-be-detected can be detected precisely.

The infrared ray detecting element is placed on the space behind the plastic film and is not exposed to the ambient atmosphere. Therefore, the infrared ray detecting element is not polluted so that the temperature of the body-to-be detected can be detected stably for a long time.

The above and other objects and features of the present invention will be more apparent from the following description taken in conjunction with the accompanying drawings.

BRIEF DESCRIPTION OF THE DRAWINGS

FIG. 6 is a circuit diagram showing another embodiment of the detection circuit used for the non-contact temperature sensor according to the present invention;

DESCRIPTION OF THE PREFERRED EMBODIMENTS

Figure 1:
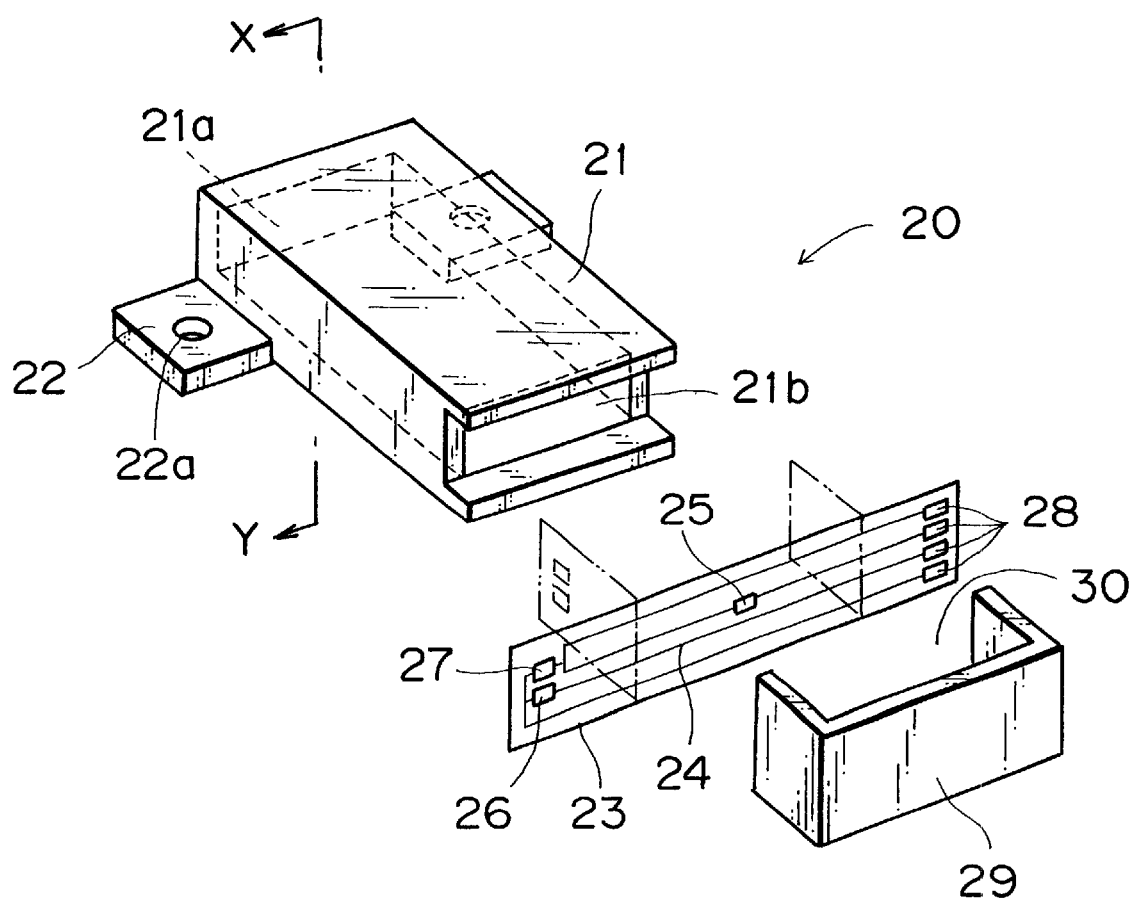
FIG. 1 is an exploded perspective view showing an embodiment of a non-contact temperature sensor according to the present invention.

Now referring to the drawings, an explanation will be given of several embodiments of a non-contact temperature sensor and a detection circuit therefor.

In FIG. 1, a non-contact temperature sensor, generally 20, is composed of a holder 21 of a light conducting portion with a rectangular sectional shape, a plastic film 23 with heat-sensitive elements attached and a cover 29. The holder 21 is constructed of an infrared ray conducting portion formed between one opening end 21*a* to which infrared rays are incident and the other end 21*b* covered with a plastic film 23 and sealed by the cover 29. The plastic film 23 is provided with an infrared ray detecting heat-sensitive element 25 (hereinafter referred to as also "infrared ray detecting element") in its rear face (opposite to the face to which the infrared rays are incident). A space 30 is formed between the plastic film 23 and cover 29. The holder 21 is provided with an attaching ear 22 having an attaching hole 22a used to mount the non-contact temperature sensor 20 in the vicinity of a body-to-be-detected.

The holder 21 is made of the metal such as aluminum having a large thermal conductivity and a small thermal radiation coefficient. The inner face thereof constitutes a reflecting face reflecting infrared rays. As occasion demands, the reflecting face may be polished to increase the reflection coefficient. Otherwise, the holder 21 itself may be made of resin, and a metallic layer for reflecting the infrared rays may be individually formed on the internal face thereof. Further, an infrared ray absorbing film may be formed entirely or partially on the inner face of the light conducting portion. Because of the provision of the infrared ray absorbing film, even if the toners flying in the vicinity of the fixing device are applied to the inner face of the holder 21, it does not influence the output signal from the infrared ray sensor since the thermal radiation coefficient of the toners is approximate to 1.

The infrared ray absorbing film can be formed by painting plastic or rubber on the inner face or/and the outer face of the light conducting portion. The film is preferably made of a black-body radiator having a radiation coefficient of 0.94 or larger. At least a part of the inner face of the holder 21 may be subjected to anodic oxide coating or "ALMITE" (trade name) in order to provide the same effect as the infrared ray absorbing film.

The shape of the opening 21a of the holder 21 is suitably selected on the basis of several conditions such as the size and shape of the body to be detected and distance thereof from the temperature sensor. For example, where the surface temperature of the heating/fixing roller is measured, since the heating/fixing roller is a heat-generating body having a horizontally long shape, the opening 21a of the holder 21 is designed to have a horizontally-long or elliptical shape enlarged in an axial direction of the roller. Such a shape improves the heat-gathering effect to increase the detecting sensitivity and thermal response.

Where the non-contact temperature sensor is set further apart from the body-to-be-detected, the opening 21a is also further apart from the body. Therefore, if the infrared ray absorbing film is formed on the inner face of the light conducting portion, the heat radiated from the background other than the body-to-be-detected and incident on the light conducting portion is absorbed by the infrared absorbing film and does not reach the plastic film 23. In this way, an error in the detecting temperature due to the heat radiation from the background can be excluded and only the heat radiated from the body-to-be-detected can be detected precisely. The same effect can also be obtained by resin-molding the light conducting portion instead of providing the infrared ray absorbing film on the inner face of the light conducting portion. The heat-sensitive elements 25–27 may be thin film thermistors, but should not be limited to them.

A detailed explanation will be given of the plastic film 23. The plastic film 23 includes a wiring pattern 24 formed on its one surface and an infrared ray detecting element 25 for detecting infrared rays, and temperature compensating heat-sensitive elements (hereinafter referred to as also "temperature compensating element") 26 and 27 which are located adjacently to each other. These heat-sensitive elements 25, 26 and 27 are connected to the wiring pattern 24. An externally extending terminal is formed at the one end of the wiring pattern 24. The heat-sensitive element 25 is centered on the side of the plastic film 23 opposite to the side on which the infrared rays are incident. The temperature compensating elements 26 and 27 are formed at the other end of the plastic film 23. The plastic film 23 is intimately attached to the opening 21b and the cover 29 is mounted on the plastic film 23. Thus, the infrared ray detecting element 25 is approximately centered on the opening 21b, and the temperature compensating elements 26 and 27 are arranged on the other side of the holder 21. The temperature compensating elements 26 and 27 serve to detect the environmental temperature and also detect the temperature of the holder 21.

The plastic film 23 is made of high-polymer such as TEFLON™ (a registered trademark of E. I. duPont de Nemours and Company of Wilmington, Del. for polytetrafluoroethylene), silicone, polyimide, polyester, polyethylene and polycarbonate, PPS (polyphenylene sulfide), but may be any other material as long as it absorbs the infrared rays. Further, the resin may be mixed with carbon black or inorganic pigment (at least one of chrome yellow, iron red, titanium white, ultramarine blue) so that it may absorb the infrared rays in an entire region). An infrared ray reflecting film may be provided on the back face of the plastic film 23 or the space 30 behind it to reflect the heat radiated from the plastic film 23, thereby improving the detecting sensitivity.

On the other hand, it is assumed that the non-contact temperature sensor according to the present invention is mainly applied in a fixing device of a copy machine. The fixing device suffers from the heat radiation from the several members outside the non-contact temperature sensor. Owing to the heat radiation, an error in the temperature detection is likely to occur. In order to avoid such an inconvenience, the outer surface of the holder or cover of the non-contact temperature sensor is plated, polished, or covered with a thin film or foil of an infrared ray reflecting material so that the infrared rays can be reflected. This minimizes the external influence, thereby further improving the detecting sensitivity.

Figure 2:
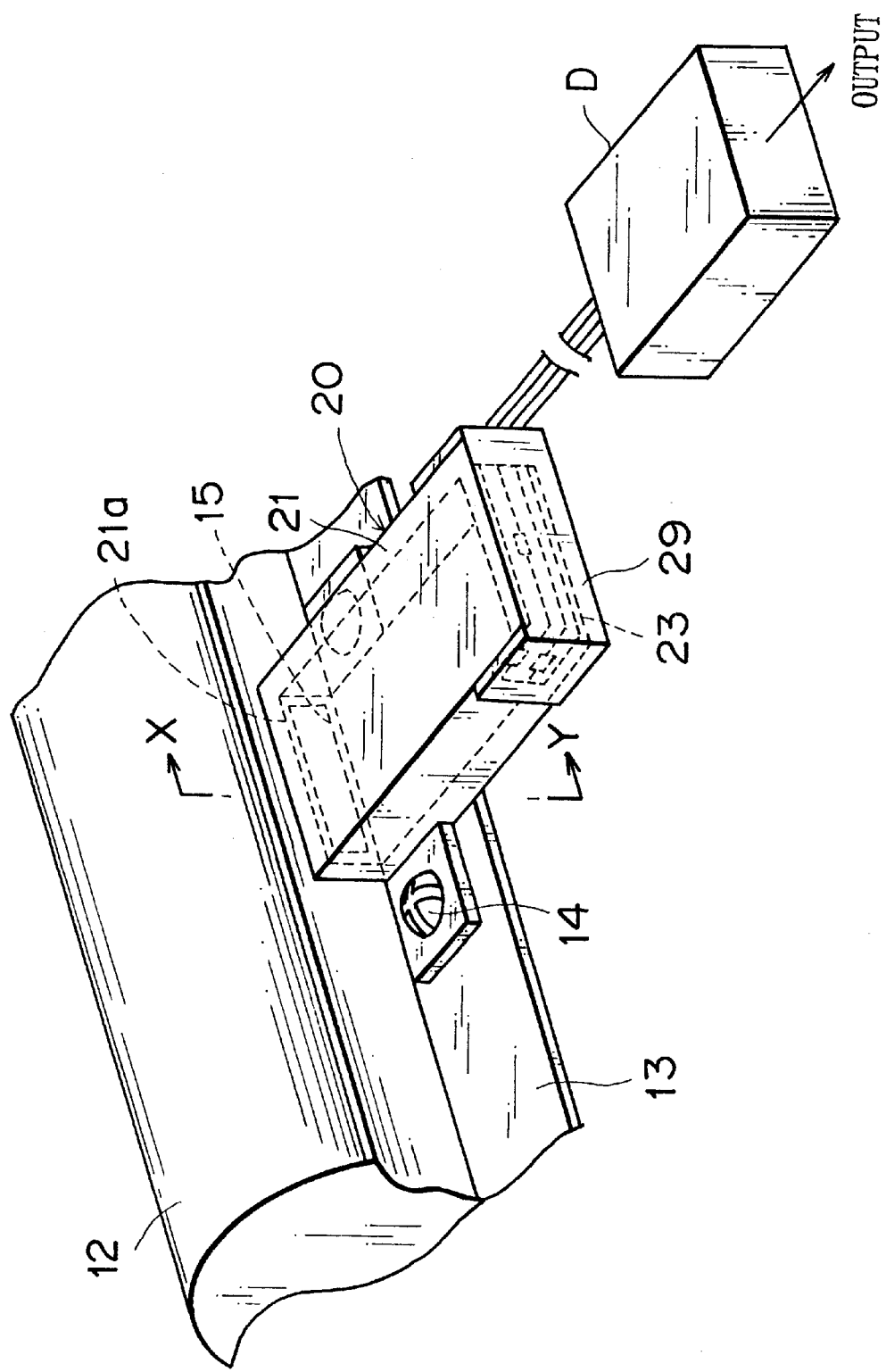
FIG. 2 is a perspective view of the state where the non-contact temperature sensor according to the present invention is mounted in a heating/fixing roller.
Figure 3:
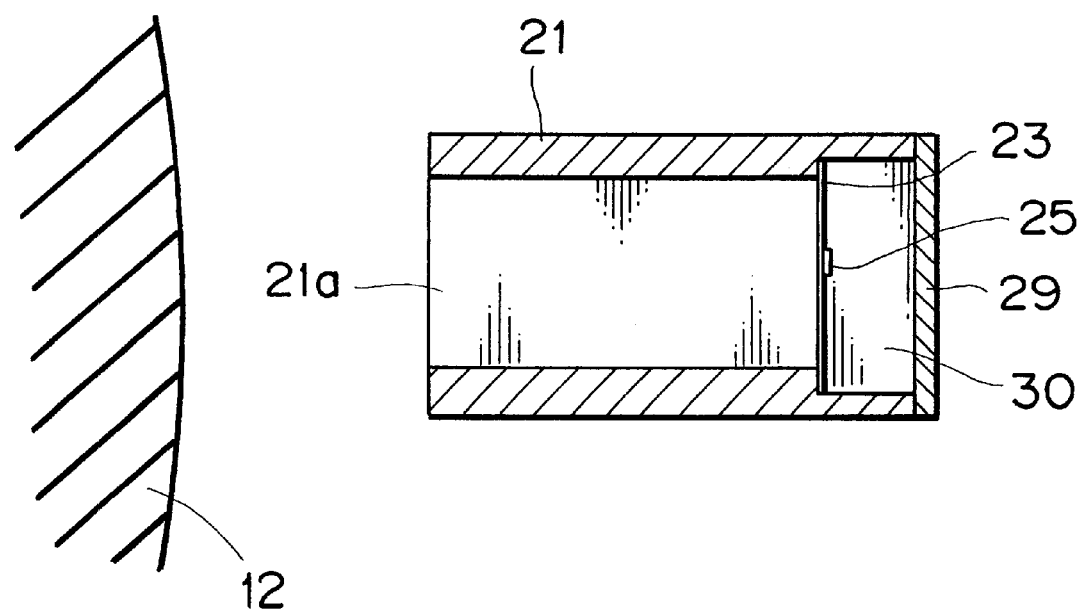
FIG. 3 is a sectional view taken in line X-Y of the non-contact temperature sensor in FIG. 2.

FIG. 2 shows a typical mounting state of the non-contact temperature sensor 20 shown in FIG. 1. As seen from FIG. 2, L-shape metal fittings 13 having an opening 15 is attached to a heating/fixing roller 12 in its axial direction. Using a bolt 14, the non-contact temperature sensor 20 is secured to the L-shape metal fittings 13 so that the opening 21a of the sensor 20 is coincident to the opening 15 of the metal fittings 13. The opening 21a of the non-contact temperature sensor 20 extends horizontally in the axial direction of the heating/fixing roller 12. Therefore, the non-contact temperature sensor 20 can effectively trap the heat radiated from the heating/fixing roller 12. Further, the infrared rays incident from the opening 21a are reflected internally in the holder 21 to reach the plastic film 23 and infrared ray detecting element 25 in the opening 21b. The outputs from the infrared rays detecting element 25 and temperature compensating elements 26 and 27 are supplied to a detecting circuit D.

Figure 4A:
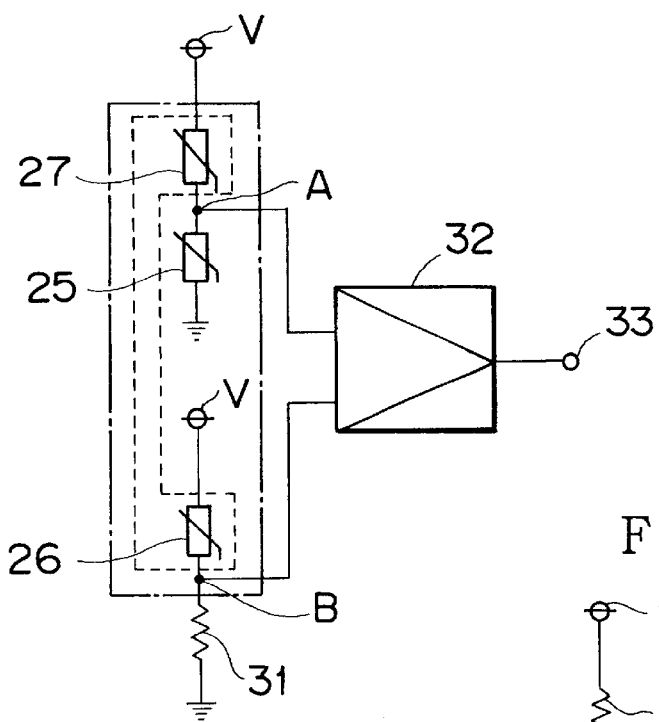
FIGS. 4A–4C are circuit diagrams of a detection circuit for the non-contact temperature sensor according to the present invention, respectively.
Figure 4B:
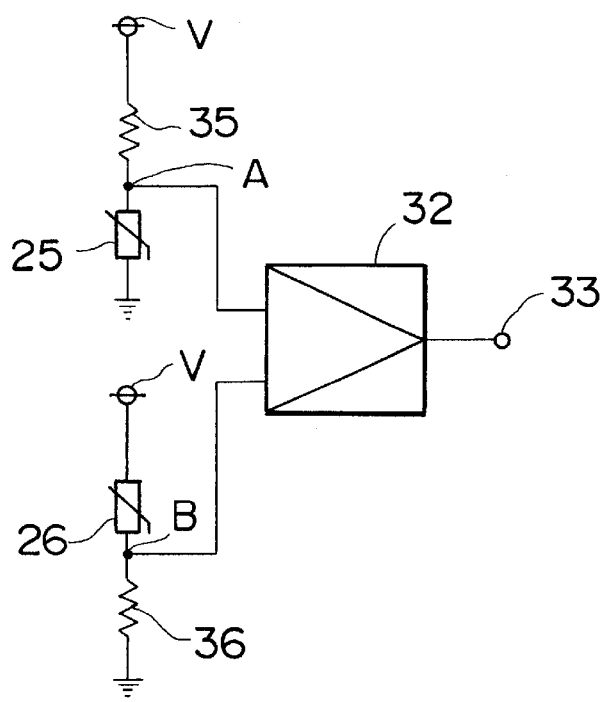
Figure 4C:
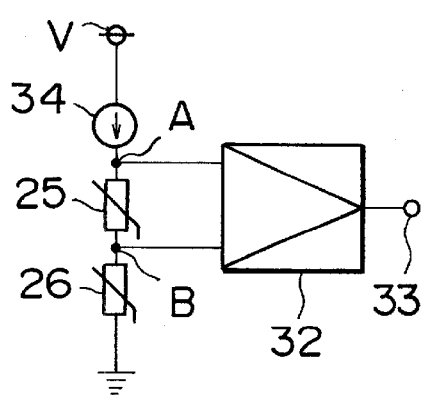

Referring to FIGS. 4A to 4C, an explanation will be given of several concrete examples of the detecting circuit D for the non-contact temperature sensor.

In the example shown in FIG. 4A, the temperature compensating element 27 and infrared rays detecting element 25 are connected in series between a power supply terminal V and ground. Likewise, the temperature compensating element 26 and the resistor 31 are connected in series between the power supply terminal V and ground. A connecting point A of the heat-sensitive elements 27 and 25 and another connecting point B of the heat-sensitive element 26 and resistor 31 are connected to input terminals of an operational amplifier 32. An output from the amplifier 32 is obtained from an output terminal 33. Those circuit elements constitutes a bridging circuit.

An explanation will be given of the operation of the detecting circuit in connection with the non-contact temperature sensor. The infrared rays emitted from the surface of the heating/fixing roller are incident on the opening 21a of the non-contact temperature sensor 20 and reach the plastic film 23 through the light conducting portion. The infrared ray energy absorbed in the plastic film is converted into heat. The heat is transmitted to the infrared ray detecting element 25 so that its temperature is risen. In this case, since the area of the plastic film 23 corresponding to the opening also receives the infrared rays, the temperature of the plastic film 23 is also risen. Thus, the heat converted from the infrared rays is effectively transmitted to the infrared ray detecting element 25. The heat-sensitive elements 25 and 26 have substantially the same temperature characteristic. When the resistance of the infrared ray detecting element 25 varies owing to the infrared rays from the body-to-be-detected, the potential at the connecting point A also varies. Simultaneously, since the temperature of the holder 21 rises owing to the heat radiated from the body-to-be-detected and the heat from the environmental atmosphere, the resistance of each of the temperature compensating elements 26 and 27 located on the outer surface of the holder 21 suffers from a change corresponding to the temperature rise in the holder 21. Since the temperature compensating elements 26 and 27 have substantially the same temperature characteristic as described above, only the temperature change due to the infrared rays from the body-to-be-detected can be detected on the basis of the change in the potential at the connecting point A. Likewise, the detection circuit shown in FIG. 4B can be also adopted.

In the detection circuit as shown in FIG. 4C, a series connection of the heat-sensitive elements 25 and 26 is connected to a constant current source 34. The connecting point A between the constant current source 34 and the heat-sensitive element 25 and the connecting point B between the heat-sensitive elements 25 and 26 are connected to the input terminals of an operational amplifier 32. The output from the operational amplifier 32 is obtained at its output terminal 33. The sum of the outputs at the connecting points A and B is outputted. Therefore, in the constant current system of FIG. 4C, if the output across the heat-sensitive element 26 is added to or subtracted from the output at the connecting point A, the output with the influence from the environmental atmosphere canceled can be obtained at the output terminal 33 of the operational amplifier 32. Thus, the circuit configuration can be simplified as compared with the other circuit system.

Figure 5:
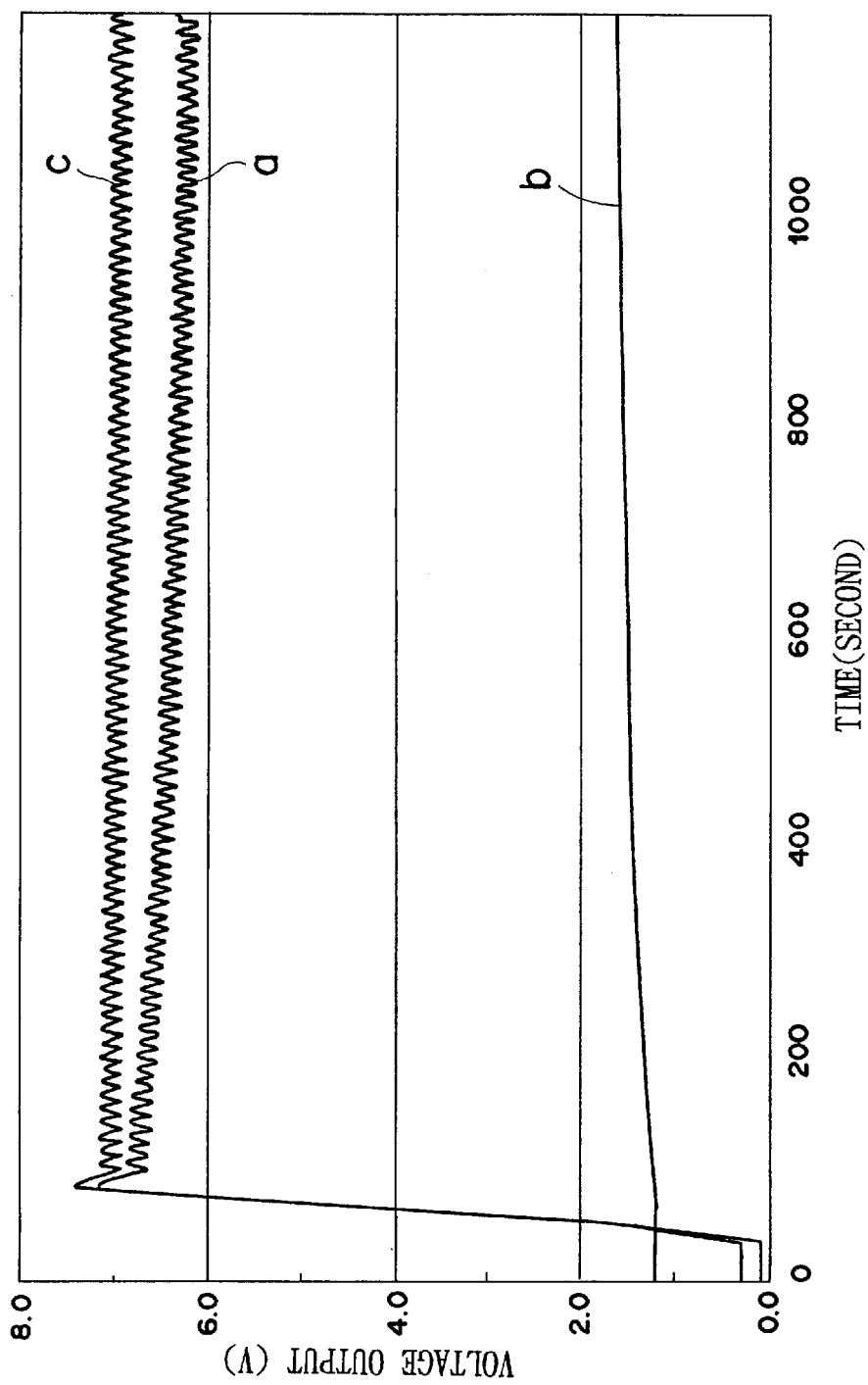
FIG. 5 is a graph for explaining the temperature control by the non-contact temperature sensor according to the present invention.

FIG. 5 shows an example of the manner of actual temperature control in connection with a heating/fixing roller. The temperature of the holder 21 varies owing to the heat radiated from the body-to-be-detected and/or convection in the vicinity of the sensor. As seen from curve a in FIG. 5, the control output (control temperature) varies with passage of time so that the potential at the connecting point A of the detection circuit in FIG. 4 cannot be temperature-controlled precisely. In the present invention, the temperature compensating element 26 is arranged in the neighborhood of the temperature compensating element 27. When the temperature in the vicinity of the sensor rises, the surface temperature of the holder 21 also rises. Therefore, the output from a bridge circuit composed of the temperature compensating element 26 and resistor 31, i.e. the potential at the connecting point B rises with passage of time like curve b in FIG. 5. This leads to the change in the control temperature as illustrated like curve a. In order to avoid such an inconvenience, in accordance with the present invention, the output from the temperature compensating element 26, indicative of the change in the environmental temperature, is added to the sum of the outputs across the temperature compensating elements in order to cancel the influence from the ambient temperature. Accordingly, the infrared ray output from the body-to-be-detected can be detected precisely as illustrated by curve c in FIG. 5.

Figure 7:
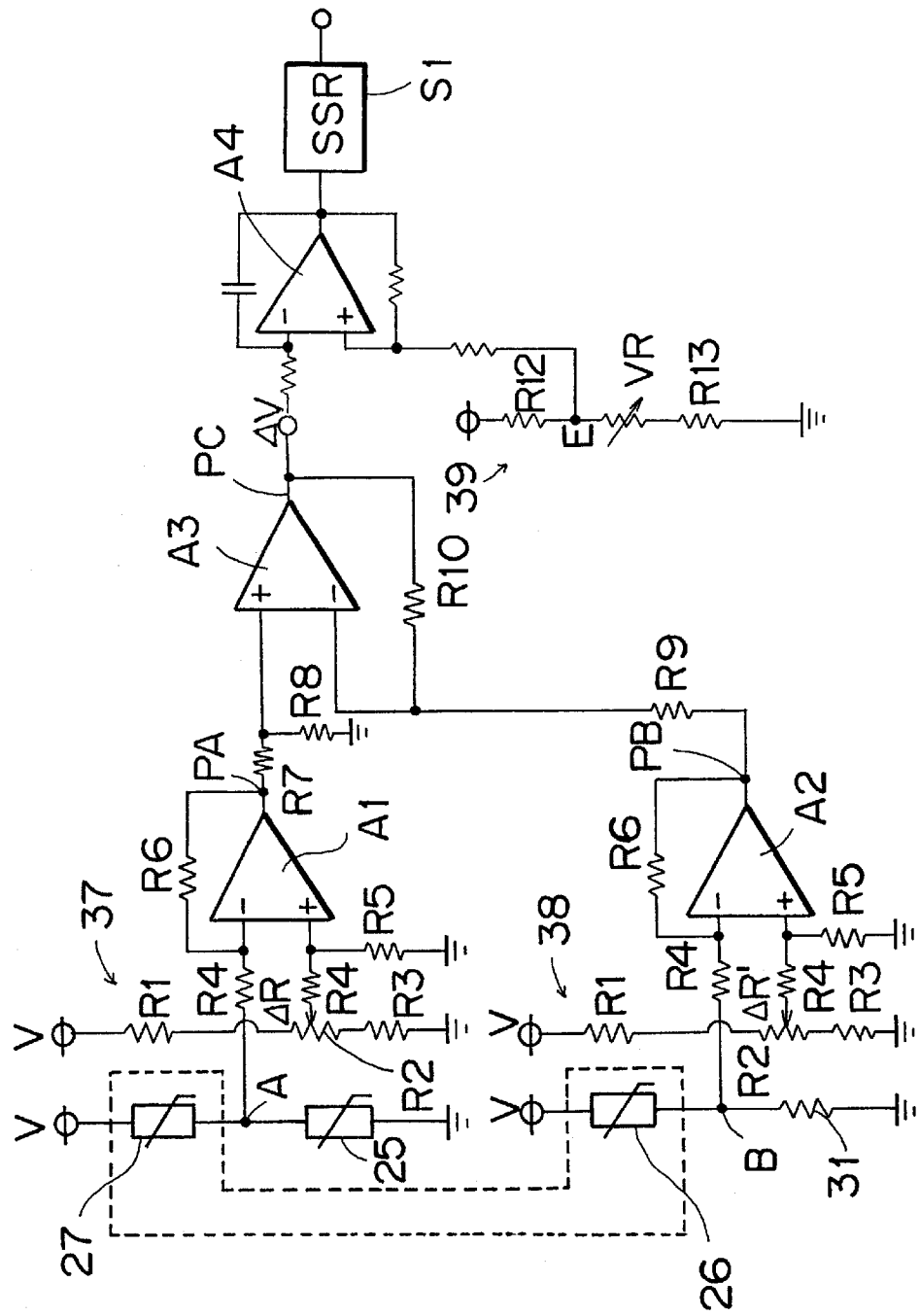
FIG. 7 is a circuit diagram showing still another embodiment of the detection circuit used for the non-contact temperature sensor according to the present invention.
Figure 8:
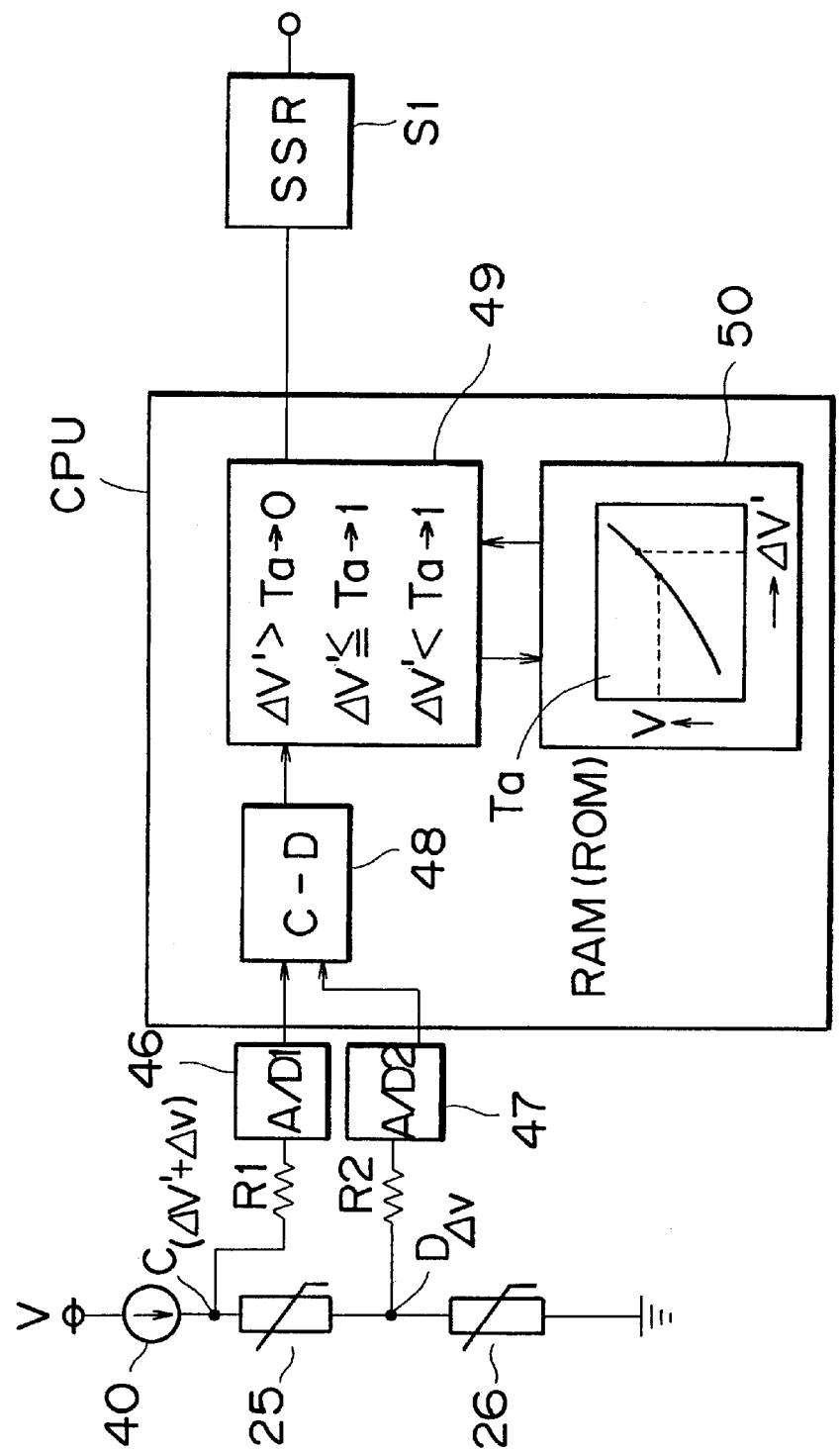
FIG. 8 is a circuit diagram showing yet another embodiment of the detection circuit used for the non-contact temperature sensor according to the present invention.

Referring to FIGS. 6–8, an explanation will be given of further examples of the concrete detecting circuit for the non-contact temperature sensor. In FIG. 6, the temperature compensating element 27 and infrared ray detecting element 25 are connected in series between a power supply terminal V and ground. A series connection of a resistor R1, a variable resistor R2 and a resistor R3 constitutes a reference voltage source circuit 37. Likewise, the temperature compensating element 26 and a resistor 31 are connected in series between the power supply terminal V and ground. A series connection of a resistor R1, a variable resistor R2 and a resistor R3 constitutes another reference voltage source circuit 38. The temperature compensating elements 26 and 27 are arranged in proximity to each other.

An inverted amplifier A1 is configured so that the resistor R4 is connected between its inverting input terminal and a connecting point A of the heat-sensitive elements 27 and 25, the resistor R4 is connected between the variable resistor (non-inverted input terminal)and its non-inverted input terminal, and the resistor R5 is connected between the non-inverted terminal and ground. The output from the inverted amplifier A1 is connected to the non-inverting input terminal of an operational amplifier A3 through a resistor R7. An inverted amplifier A2 is configured so that the resistor R4 is connected between its inverting input terminal and a connecting point B of the heat-sensitive element 26 and the resistor 31, the resistor R6 is connected between its inverting input terminal and the output terminal, and the resistor R5 is connected between the non-inverting input terminal and ground. The resistors R5 and R6 have equal resistance values. The output terminal from the inverting amplifier A2 is connected to the inverting input terminal of an operational amplifier A3 through a resistor R9. The operational amplifier A3 is configured so that a resistor R10 is connected between the inverting input terminal and output terminal, and a resistor R8 is connected between the non-inverting input terminal and ground. The operational amplifier A3 takes the sum of the outputs at the points PA and PB to provide the output voltage $\Delta V$ corresponding to a temperature change $\Delta T$ due to the infra-red ray energy from the heating/fixing roller 12 with the influence from the ambient temperature canceled from the output terminal PC.

The output voltage $\Delta V$ is comparison-operated by an operational amplifier A4 as shown in FIG. 7 to provide a control output signal. The control output signal is used for controlling the temperature control in the fixing device. In FIG. 7, a series connection of resistors R12 and R13 and a variable resistor VR constitutes a temperature setting circuit 39. A point E of the temperature setting circuit 39 is connected to the inverting input terminal of an operational amplifier A4. The output terminal from the operational amplifier A3 is connected to the non-inverting input terminal of the operational amplifier A3 through a resistor. In operation, the output voltage $\Delta V$ is supplied to the inverting input terminal of the operational amplifier (comparator) A4.

The variable resistor VR of the temperature setting circuit for setting a desired temperature is adjusted to compare the potential at point E with the output voltage ΔV. Using the output from the comparator A4, a solid-state-relay S1 is controlled to take out the control signal at any setting temperature.

The surface temperature of the body-to-be-detected can be detected by a digital temperature control circuit using a microcomputer as shown in FIG. 8. In FIG. 8, the output voltages (ΔV'+Δv) and Δv at the points C and D in a series circuit of the heat-sensitive elements 25 and 26 connected to a constant current source 40 are supplied to A/D converters 46 and 47 through R1 and R2 to provide digitized (ΔV'+Δv) and Δv. The digitized output Δv from the A/D converter 47 corresponds to the temperature-compensated output. The outputs ΔV'+Δv are supplied to a microcomputer CPU. In CPU, a subtracting means 48 calculates ΔV' which is in turn supplied to a condition deciding means 49. The condition deciding means 49 decides "1" or "0" with reference to a data table 50 on which the relationship between ΔV' and setting temperature Ta is stored, thereby controlling the solid-state relay S1. If "1", the heater is energized. If "0", the energization of the heater is stopped. Through such a control, the surface of the heating/fixing roller can be set at a prescribed temperature.

In FIG. 8, the temperature detecting circuit of FIG. 4C was used. However, the detecting circuit as shown in FIG. 4A or 4B may be used. In the case of using the temperature detecting circuit of FIG. 4A, a temperature-compensated output is provided which is in turn supplied to the microcomputer CPU through the A/D converter. In this case also, the surface temperature is detected with reference to a data table 50 in FIG. 8. In the case of using the temperature detecting circuit of FIG. 4B also, the same operation as in the case of using the CPU of FIG. 8 is carried out to detect the surface temperature of the body-to-be-detected.

Figure 9:
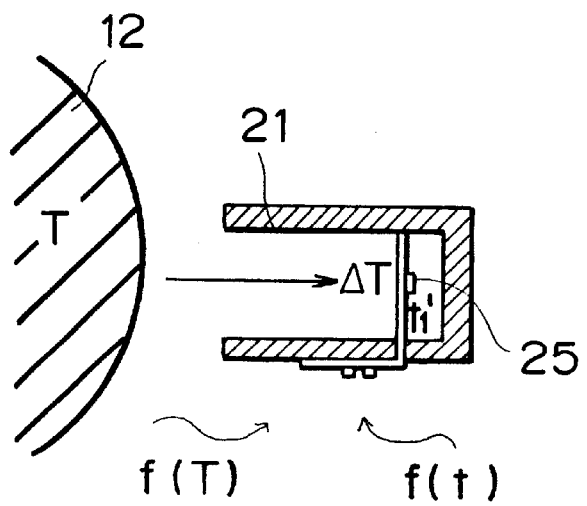
FIG. 9 is a view for explaining the operation of the non-contact temperature sensor according to the present invention.

Now referring to FIG. 9, an explanation will be given of the operation theory of the non-contact temperature sensor. The output voltage ΔV from the operational amplifier A3 corresponds to a temperature change by the infrared ray energy from the heating/fixing roller 12. Assuming that the surface of the heating/fixing roller 12 is T, the temperature t1 of the holder 21 (case temperature) can be expressed as t1=Δf(T)+Δf(to) where Δf(T) denotes a temperature change due to the heating/fixing roller 12 and Δf(t) denotes a change in the ambient temperature.

The ambient temperature t1' of the infrared ray detecting heat-sensitive element 25, which is approximately equal to the case temperature t1, can be expressed by t1'≈t1 (other factor than the case temperature t1). The temperature change due to the thermal radiation form the heating/fixing roller 12 is detected by the infrared ray element 25.

The temperature change due to the infra-red ray detecting element from the heating/fixing roller, which is detected by the infrared ray detecting element, can be expressed by ΔT+t1'. ΔT adheres to the Stefan-Boltzmann Law.

On the other hand, the temperature detected by the temperature compensating element, which is thermally coupled with the case, is equal to the case temperature t1. Both infrared ray detecting element and temperature compensating element suffer from the same affect. Therefore, by subtracting t1(=t') from ΔT+t1, ΔT can be acquired. Namely, the surface temperature T of the heating/fixing roller can be acquired.

The output from the inverting amplifier A1 can be expressed by PA=ΔT+t' in terms of the temperature. Likewise, the output from the inverting amplifier A2 can be expressed by PB=t1. Thus, the operational amplifier A3 of the detecting circuit in FIG. 6 provides an output PC (PA−PB)≈ΔT. In this way, by using th e non-contact temperature sensor according to this embodiment, the temperature can be detected without performing the arithmetic operation using a complicated function.

Figure 10A:
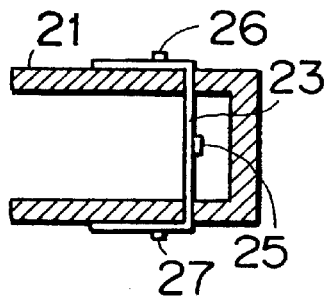
FIGS. 10A–10C are sectional views of other embodiments of the non-contact temperature sensor according to the present invention.
Figure 10B:
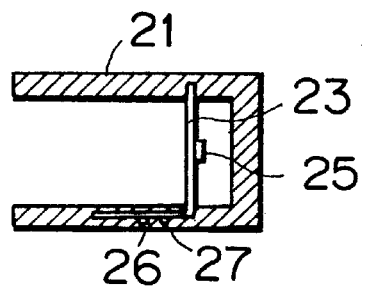
Figure 10C:
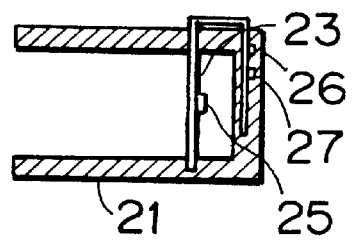

Now referring to FIGS. 10A–10C, an explanation will be given of another embodiment of the n on-contact temperature sensor shown in FIG. 1. The fitting structure of the plastic film 23 should not be limited to that shown in FIG. 1, but may be those shown in FIGS. 10A–10C. Namely, in FIG. 10A, the temperature compensating elements 26 and 27 are arranged on both sides of the outer surface of the holder 21. In FIG. 10B, the temperature compensating elements 26 and 27 are arranged on the one side of the holder 21. In FIG. 10C, the temperature compensating elements 26 and 27 are arranged behind the space where the infrared ray detecting element 25 is accommodated. The plastic film 23 may be inserted in a slit formed at the rear end of the holder of the light conducting portion with the one end opened and the other end closed, and the heat-sensitive elements may be formed apart from the opening of the holder.

In order to improve the detecting sensitivity, the holder of the light conducting portion of the non-contact temperature sensor may be tapered so that the infrared rays incident from the body-to-be-detected to the light conducting portion are focused on the heat-sensitive elements.

The temperature compensating elements 26 and 27 may be arranged at any position on the holder as long as both provide substantially equal temperatures. Namely, they are not required to be arranged in close proximity to each other.

Figure 11A:
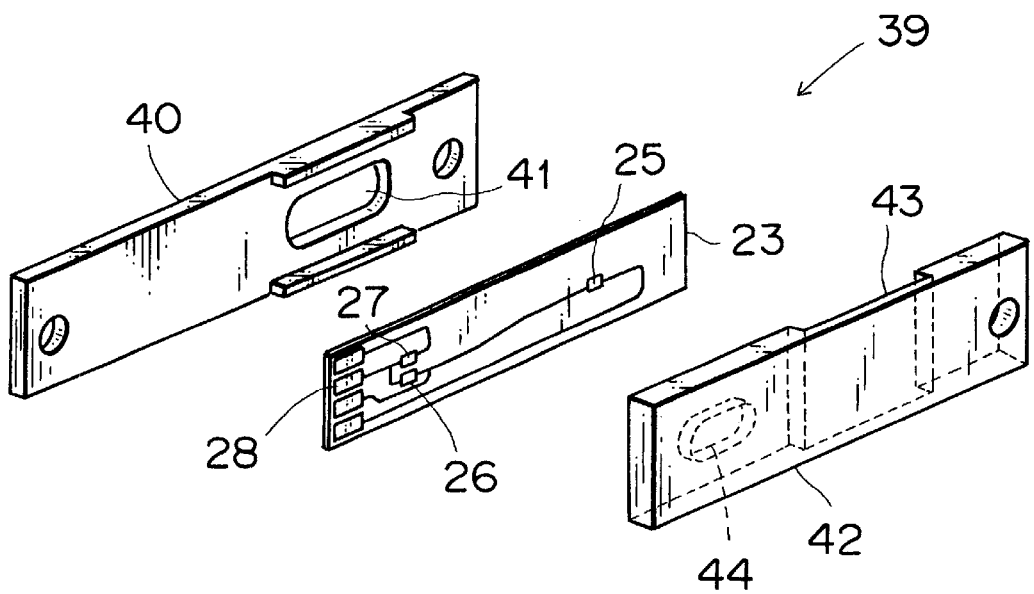
FIGS. 11A–11C are views showing a further embodiment of the non-contact temperature sensor according to the present invention.
Figure 11B:
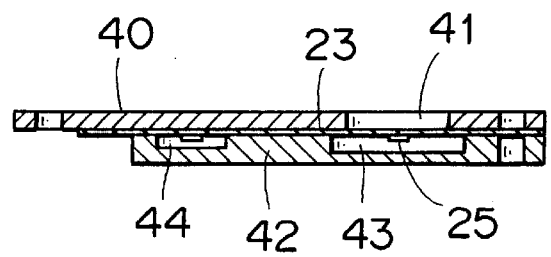
Figure 11C:
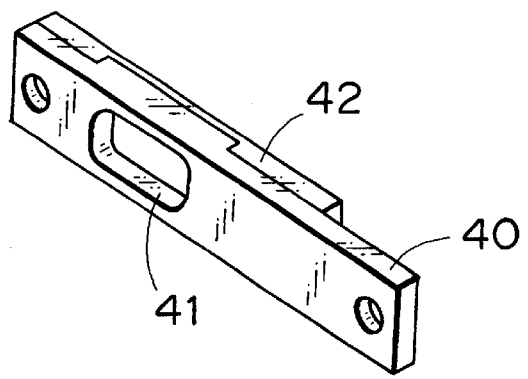

Referring to FIGS. 11A–11C, an explanation will be given of still another embodiment of the non-contact temperature sensor according to the present invention. FIG. 11A is an exploded perspective view of the non-contact temperature sensor; FIG. 11B is a section view thereof; and FIG. 11C is a perspective view thereof. The non-contact sensor according to this embodiment intends to detect the temperature of body-to-be-detected which is located nearby in a non-contact manner. A non-contact temperature sensor 39 includes a plate-like holder 40 having an opening 41, a plastic film 23 having a wiring pattern of electrically connecting infrared ray detecting element 25, temperature compensating elements 26 and 27, and a cover member 42. The cover member 42 has a space area providing a space behind the infrared ray detecting element 25 and a concave area 44 providing a space behind the temperature compensating elements 26, 27. When the plastic film 23 is secured by the holder 40 and the cover member 42, the infrared ray detecting element 25 is housed in the space area 43 and the temperature compensating elements 26, 27 are housed in the concave area 44.

The plastic film 23 is arranged on the back surface of the holder 40 (opposite to the surface to which infrared rays are incident) so as to cover an opening 41 of the holder 40. The infrared rays are incident form the opening 41, and the plastic film 23 exposed within the opening 41 is irradiated with the infrared rays. The plastic film 23 is made of a material capable of absorbing infrared rays such as polyester resin, polyimide resin, etc. as described above, or a material with carbon black or inorganic pigment dispersed in the resin capable of absorbing the infrared rays over the entire wavelength. The infrared ray detecting element 25 and temperature compensating elements 26, 27 are electrically coupled with the wiring pattern formed on the surface of the resin film 23 opposite to the surface thereof to which the infrared rays are incident. When the cover 42 is attached to the holder 40, the plastic film 23 is brought into intimate contact with the surface of the holder 40. As a result, the infrared ray detecting element 25 is centrally arranged on opening 41 of the holder 40, and the temperature compensating elements 26 and 27 are housed in the concave portion 44. The temperature compensating elements 26 and 27 are adapted to detect the temperature of the holder 40 inclusive of the cover 42.

The temperature compensating elements 26 and 27 are preferably arranged in proximity to each other so that the ambient temperature in the same area can be detected. An external output terminal 28 is formed at the end of the wiring pattern formed on the plastic film 23. These temperature compensating elements 26 and 27 are constructed of thin film thermistors, and connected to the wiring pattern. The temperature compensating elements 26 and 27 should not be limited to the thin film thermistors, but may be semiconductor temperature sensors.

In this embodiment, the temperature compensating elements as well as the infrared ray detecting element are arranged on the same plastic film. However, the temperature compensating elements may be individually on the surface of or within the holder as long as it detects the temperature of the holder.

The holder 40 is made of metal such as aluminum having a large thermal conductivity and a small thermal radiation coefficient. However, instead of this, the holder 40, which is made of resin, may be covered with a metallic layer on its surface. The shape of the opening 41 of the holder 40 is suitably selected under the several conditions such as the size and shape of the body-to-be-detected and distance thereof from the sensor. For example, where it is intended that the surface temperature of the thermal fixing roller such as a copy machine be detected, the opening 41 of the holder 41 is formed in a horizontal shape or elliptical shape extending in an axial direction of the roller, thereby enhancing the detecting sensitivity and the thermal response. Where the diameter of the roller is small, in order to decrease the view angle of the opening 41, the width of the opening perpendicular to the roller axis is decreased and the length of the opening in the axial direction is increased.

The non-contact temperature sensor shown in FIG. 11, which is arranged in proximity to the body-to-be-detected, can provide a detected output substantially equal to that in the non-contact temperature sensor provided with a holder having a light conducting portion. According to the setting condition, the detected output may be reduced by 10–15%. However, the value is in the level which can be actually used. The detection sensitivity of the non-contact temperature sensor depends on the distance thereof from the body-to-be-detected. Therefore, where there is not a sufficient space for installing the non-contact temperature sensor in FIG. 1, the non-contact temperature sensor shown in FIG. 11 is installed in proximity to the body-to-be-detected so that the temperature of the body-to-be-detected can be detected precisely.

Figure 12A:
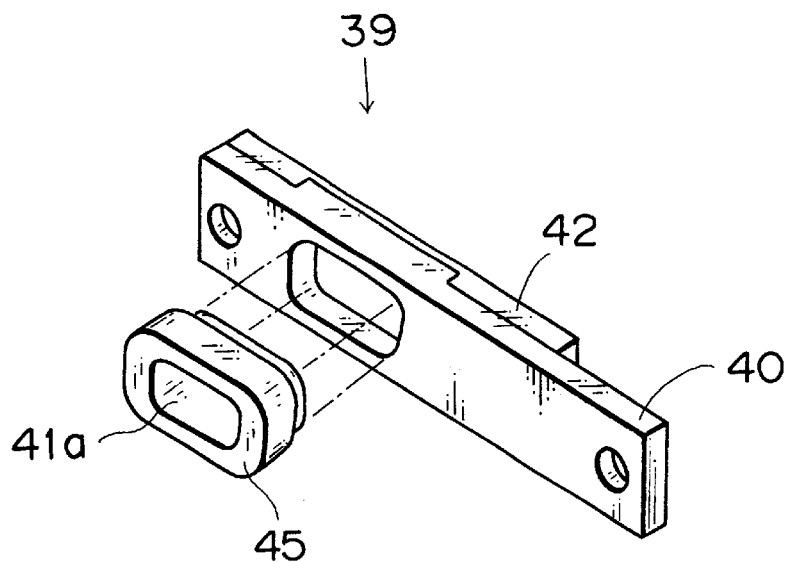
FIGS. 12A and 12B are views showing a still further embodiment of the non-contact temperature sensor according to the present invention.
Figure 12B:
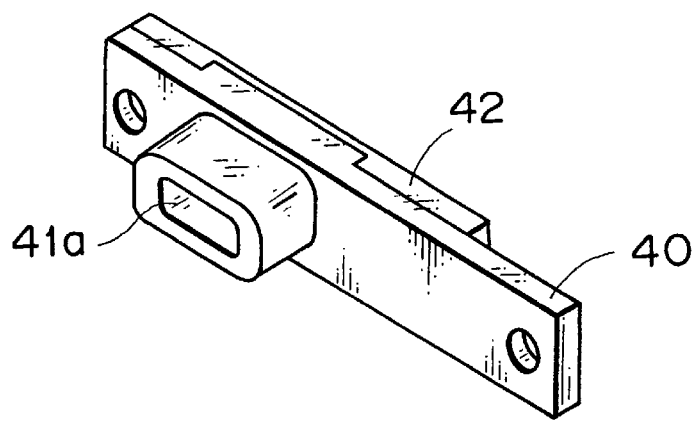
Figure 13:
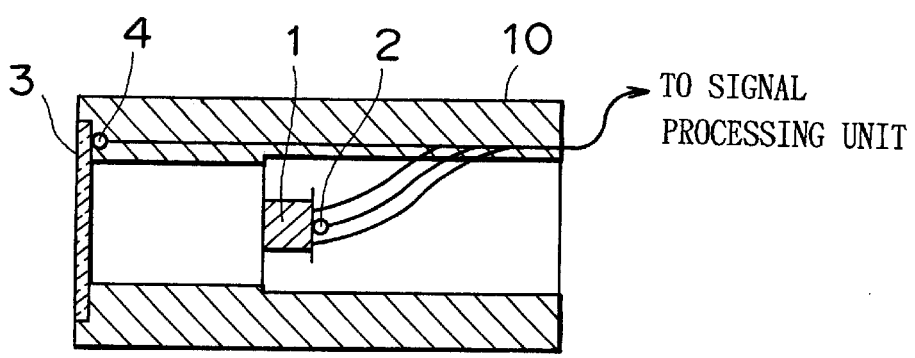
FIG. 13 is a sectional view showing an example of a conventional non-contact temperature sensor.
Figure 14:
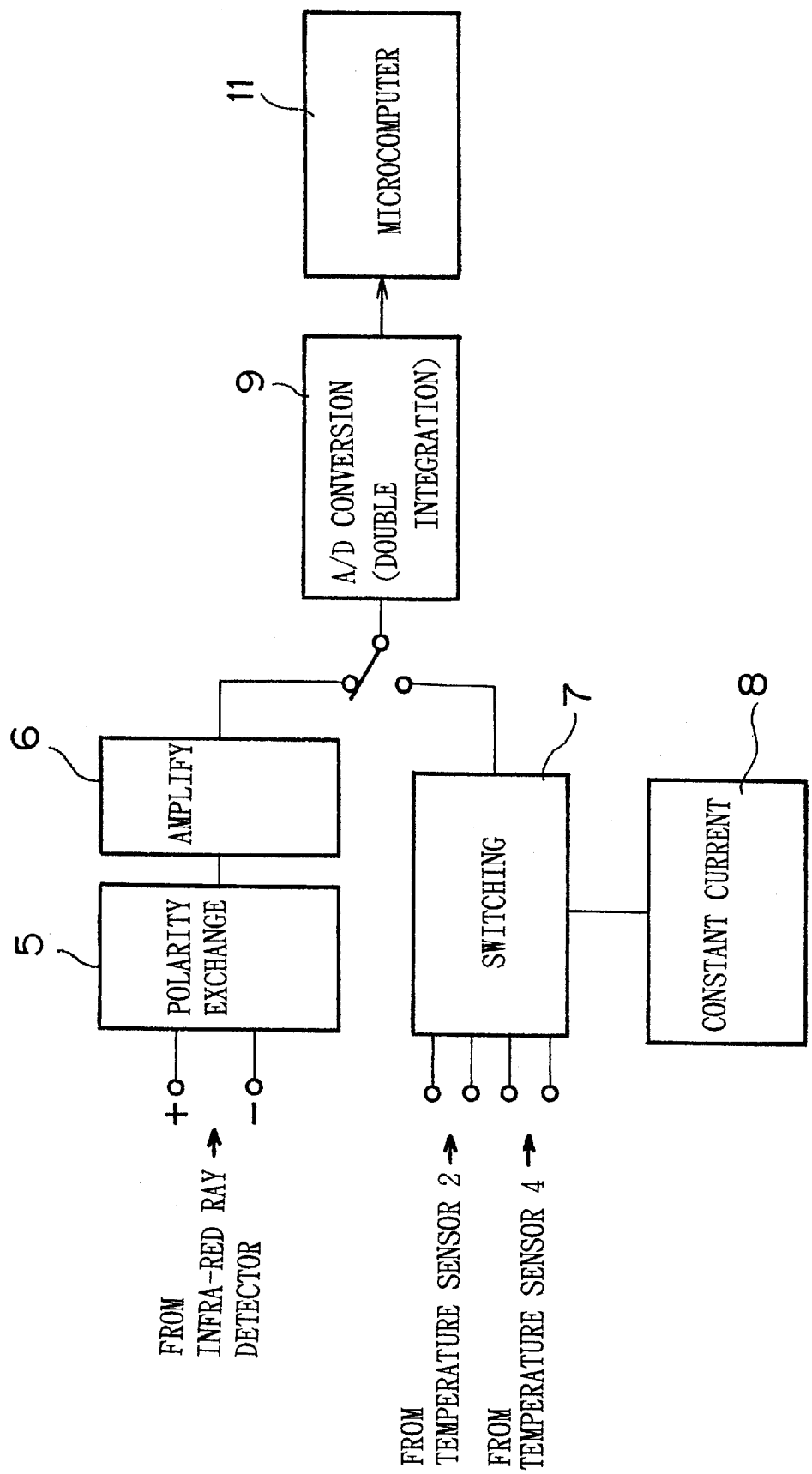
FIG. 14 is a circuit diagram showing a conventional non-contact sensor.

FIG. 12 shows a non-contact temperature sensor according to a further embodiment of the present invention. As seen from FIG. 12, a non-contact temperature sensor 39 according to this embodiment has a structure in which the sensor shown in FIG. 11 is provided with an elliptical cylindrical light conducting portion 45 which is resin-molded. The sensor according to this embodiment is different from that shown in FIG. 11 only that the light conducting portion 45 is attached to the opening 41. The sensor according to this embodiment, which can ignore the influence of the infrared rays incident to an opening 41a of the light conducting portion 45 from the other portion than the body-to-be-detected, can detect only a temperature change of the body-to-be-detected precisely.

The shape of the cover 42 should not be limited to that shown in FIG. 11, but may be a slidable type (which can be used in the embodiment shown in FIG. 1).

In this embodiment, an external extending terminal can be connected to a detecting circuit through a lead in an ordinary manner.

In this embodiments in the description hitherto made, the present invention was applied to a temperature detection of the heating/fixing roller. However, the present invention can be applied to a wide technical field where the temperature is detected in a non-contact manner.

What is claimed is:

1. A non-contact temperature sensor comprising:
   a holder serving as a light conducting portion for guiding infrared rays incident from a first opening at one of opposing ends;
   a plastic film arranged at a second opening of the other end of said light conducting portion, the plastic film having a first side facing the first and second openings and a second side, opposed to the first side;
   a cover for sealing the second opening at the other of the opposing ends of the holder so as to provide a space between the cover and said plastic film;
   an infrared ray detecting heat-sensitive element formed on the second side of said plastic film, facing the space between the cover and the plastic film, for detecting the infrared rays incident from said first opening; and
   a temperature compensating heat-sensitive means arranged in the vicinity of the holder, for detecting the temperature of said holder, both the infrared ray detecting heat-sensitive element and the temperature compensating heat-sensitive means are connected to a wiring pattern formed also on the second side of the plastic film.

2. A non-contact temperature sensor according to claim 1, wherein said temperature compensating heat-sensitive means includes a first and a second temperature compensating heat-sensitive element.

3. A detection circuit for a non-contact temperature sensor as claimed in claim 2, comprising:
   a first series circuit composed of said infrared ray detecting element and said first temperature compensating element,
   a second series circuit composed of said second temperature compensating element and a resistor element; and
   an arithmetic unit for processing an output from said first series circuit and another output from said second circuit to detect a surface temperature of a body-to-be-detected.

4. A detection circuit according to claim 3, further comprising:
   a data table used to convert a numerical output value from said arithmetic processing unit into a temperature, thereby detecting the surface temperature of an object to be detected.

5. A detection circuit for a non-contact temperature sensor as claimed in claim 1, comprising:
   a first series circuit composed of said infrared ray detecting element and a resistor element;

a second series circuit composed of said temperature compensating means and another resistor element; and an arithmetic unit for processing an output from said first series circuit and another output from said second circuit to detect a surface temperature of a body-to-be-detected.

6. A detection circuit for a non-contact temperature sensor as claimed in claim 1, comprising:

a series circuit composed of the infrared ray heat-sensitive element and the temperature compensating means, through which a constant current is passed; and an arithmetic processing unit for processing an output from said series circuit and another output from said temperature compensating means to detect a surface temperature of a body-to-be-detected.

7. A non-contact temperature sensor according to claim 1, further comprising an infrared ray absorbing film attached to an inner wall of said holder.

8. A non-contact temperature sensor according to claim 1, further comprising:

an infrared ray reflective film located behind the plastic film to reflect heat radiated from said plastic film.

9. A non-contact temperature sensor according to claim 1, wherein said temperature compensating heat-sensitive means is attached to an outer wall of the holder.

10. A non-contact temperature sensor according to claim 1, wherein said first opening area has a horizon tally lengthy shape in section.

11. A non-contact temperature sensor according to claim 1, wherein said plastic film is made of a material selected from a group consisting of "TEFLON", silicone, polyimide, polyester, polyethylene, polycarbonate and PPS.

12. A non-contact temperature sensor according to claim 1, wherein said plastic film is made of a high-polymer material with carbon black or inorganic pigment dispersed.

13. A non-contact temperature sensor comprising:

a holder having a front opening area to which infrared rays are incident;

a plastic film arranged on a back side of said holder, the plastic film having a first side facing the front opening and an second side, opposed to the first side;

a cover arranged on the back side of said holder and having a space opposite to said front opening area;

an infrared ray detecting heat-sensitive element formed on the second side of said plastic film, facing the space of the cover, for detecting the infrared rays incident from said front opening; and a temperature compensating heat-sensitive means for detecting the temperature of said holder, the temperature compensating heat-sensitive means being formed on the second side of the plastic film, and both the infrared ray detecting heat-sensitive element and the temperature compensating heat-sensitive means are connected to a wiring pattern formed also on the second side of the plastic film.

14. A non-contact temperature sensor according to claim 13, wherein said temperature compensating heat-sensitive means includes a first and a second temperature compensating heat-sensitive element.

15. A detection circuit for a non-contact temperature sensor as claimed in claim 14, comprising:

a first series circuit composed of said infrared ray detecting element and said first temperature compensating element, a second series circuit composed of said second temperature compensating element and a resistor element; and an arithmetic unit for processing an output from said first series circuit and another output from said second circuit to detect a surface temperature of a body-to-be-detected.

16. A detection circuit according to claim 15, further comprising:

a data table used to convert a numerical output value from said arithmetic processing unit into a temperature, thereby detecting the surface temperature of an object to be detected.

17. A detection circuit for a non-contact temperature sensor as claimed in claim 13 comprising:

a first series circuit composed of said infrared ray detecting element and a resistor element;

a second series circuit composed of said temperature compensating means and another resistor element; and an arithmetic unit for processing an output from said first series circuit and another output from said second circuit to detect a surface temperature of a body-to-be-detected.

18. A non-contact temperature sensor according to claim 13, further comprising a light conducting member attached to said opening area.

19. A non-contact temperature sensor according to claim 18, further comprising an infrared ray absorbing film attached to an inner wall of said light conducting member.

20. A non-contact temperature sensor according to claim 13, further comprising:

an infrared ray reflective film located behind the plastic film to reflect heat radiated from said plastic film.

21. A non-contact temperature sensor according to claim 13, wherein said light conducting portion has a horizontally lengthy shape in section.

22. A non-contact temperture sensor according to claim 13, wherein said plastic film is made of a material selected from a group consisting of "TEFLON", silicone, polyimide, polyester, polyethylene, polycarbonate and PPS.

23. A non-contact temperature sensor according to claim 13, wherein said plastic film is made of a high-polymer material with carbon black or inorganic pigment dispersed.

* * * * *